(12) United States Patent
Poteet et al.

(10) Patent No.: US 12,292,376 B2
(45) Date of Patent: May 6, 2025

(54) MINIATURE MULTISPECTRAL DETECTION SYSTEM HAVING MULTIPLE SPECTROMETERS FOR ENHANCED PHOTODETECTION SPECTROSCOPY FOR DETECTION OF PATHOGENS, BIOMARKERS, OR ANY COMPOUND

(71) Applicant: Lightsense Technology, Inc., Tucson, AZ (US)

(72) Inventors: Wade Martin Poteet, Vail, AZ (US); Terje A. Skotheim, Tucson, AZ (US)

(73) Assignee: Lightsense Technology, Inc., Tucson, AZ (US)

( * ) Notice: Subject to any disclaimer, the term of this patent is extended or adjusted under 35 U.S.C. 154(b) by 58 days.

(21) Appl. No.: 17/825,942

(22) Filed: May 26, 2022

(65) Prior Publication Data

US 2022/0381681 A1 Dec. 1, 2022

Related U.S. Application Data

(60) Provisional application No. 63/194,651, filed on May 28, 2021.

(51) Int. Cl.
*G01N 21/35* (2014.01)
*G01N 21/33* (2006.01)
(Continued)

(52) U.S. Cl.
CPC .............. *G01N 21/35* (2013.01); *G01N 21/33* (2013.01); *G01N 21/64* (2013.01); *G01N 21/65* (2013.01);
(Continued)

(58) Field of Classification Search
CPC ...................................................... G01N 21/35
See application file for complete search history.

(56) References Cited

U.S. PATENT DOCUMENTS 5,736,410 A 4/1998 Zarling
6,649,416 B1 11/2003 Kauer
(Continued)

FOREIGN PATENT DOCUMENTS

CN 106018510 10/2016
WO 2008002659 1/2008

OTHER PUBLICATIONS

"Light Scattering by Tissue & Cells," 2022, 5 pages, Hunter College, New York, New York.
(Continued)

*Primary Examiner* — Hugh Maupin
(74) *Attorney, Agent, or Firm* — Jaffery Watson Hamilton & DeSanctis LLP

(57) ABSTRACT

Embodiments of this invention relate generally to a miniature multi-spectral system to detection pathogen, biomarkers, or any compound from a sample. In one example, a miniature multi-spectral system comprises a first miniature spectrometer to generate a first spectral output based on a sample, a second miniature spectrometer to generate a second spectral output based on the sample, and a processor coupled to the first and the second miniature spectrometers. The processor is configured to execute instructions to perform data fusion of the first and second spectral outputs to generate fused data, and to apply artificial intelligence (AI) of an AI module to the fused data to identify a pathogen, biomarker, or any compound from the sample.

17 Claims, 6 Drawing Sheets

(51) Int. Cl.
*G01N 21/64* (2006.01)
*G01N 21/65* (2006.01)

(52) U.S. Cl.
CPC .............. *G01N 2021/3595* (2013.01); *G01N 2201/0221* (2013.01); *G01N 2201/061* (2013.01); *G01N 2201/0636* (2013.01)

(56) References Cited

U.S. PATENT DOCUMENTS

| | | | |
|---|---|---|---|
| 8,227,260 | B2 | 7/2012 | Yguerabide et al. |
| 8,368,034 | B2 | 2/2013 | Poteet |
| 8,502,168 | B1 | 8/2013 | Poteet |
| 8,652,800 | B2 | 2/2014 | Walsh et al. |
| 9,013,686 | B2 | 4/2015 | Poteet et al. |
| 9,557,154 | B2 * | 1/2017 | Tearney ............... A61B 5/0071 |
| 2007/0037135 | A1 | 2/2007 | Barnes et al. |
| 2007/0076208 | A1 * | 4/2007 | Koo .......................... G01J 3/44 356/451 |
| 2009/0252650 | A1 * | 10/2009 | Lakshmanan ...... G01N 21/3504 422/91 |
| 2009/0326383 | A1 * | 12/2009 | Barnes .................... A61B 5/417 850/1 |
| 2011/0139990 | A1 * | 6/2011 | Xie ....................... G01J 3/4535 250/353 |
| 2014/0192365 | A1 * | 7/2014 | Mortada ............ G01B 9/02091 356/521 |
| 2014/0303932 | A1 | 10/2014 | Snow |
| 2016/0066775 | A1 * | 3/2016 | Hunter ................. G01J 3/1256 600/178 |
| 2017/0176338 | A1 * | 6/2017 | Wu ..................... G01N 21/6428 |
| 2017/0184453 | A1 * | 6/2017 | Wang ..................... G01J 3/021 |
| 2019/0056315 | A1 * | 2/2019 | Kinrot ................... G01J 3/0291 |
| 2019/0293620 | A1 * | 9/2019 | Farkas ............... G01N 21/3563 |
| 2022/0268751 | A1 * | 8/2022 | Farkas ................... G01N 21/55 |
| 2022/0384043 | A1 | 12/2022 | Poteet |
| 2023/0143882 | A1 | 5/2023 | Poteet et al. |

OTHER PUBLICATIONS

Arthur L. Koch and Elvera Ehrenfeld, "The Size and Shape of Bacteria by Light Scattering Measurements," Biochim. Biopsy's. Acta, Apr. 16, 1968, pp. 262-273.

Catalina E. Alupoaei et al., "Quantitative Spectroscopy Analysis of Prokaryotic Cells: Vegetative Cells and Spores," Biosensors and Bioelectronics 19, 2004, pp. 893-903, Elsevier B.V.

Le Qiu et al., "Rapid Detection and Identification of Bacteria Directly from whole Blood with Light Scattering Spectroscopy based Biosensor," 2021, 26 pages, Elsevier B.V.

Lewis R. Dartnell et al., "Fluorescence Characterization of Clinically-Important Bacteria," PLOS One, Sep. 2013, 13 pages, vol. 8, Issue 9, e75270.

Michael Stanley et al., "Sensor Analysis for the Internet of Things (Synthesis Lectures on Algorithms and Software in Engineering)," Feb. 2018, Chapter 3, p. 29 with cover sheet, Morgan & Claypool Publishers.

Milad Rabbani Esfahani et al., "Extinction, Emission, and Scattering Spectroscopy of 5-50 nm Citrate-Coated Gold Nanoparticles: An Argument for Curvature Effects on Aggregation," Spectrochimica Acta Part A: Molecular and Biomolecular Spectroscopy 175, 2017, pp. 100-109, Elsevier B.V.

Yaniv Shlosberg et al., "Fast Label-Free Identification of Bacteria by Synchronous Fluorescence of Amino Acids," Analytical and Bioanalytical Chemistry, Sep. 7, 2021, 11 pages, Springer-Verlag GmbH Germany.

Yong-Le Pan et al., "Review of Elastic Light Scattering from Single Aerosol Particles and Application in Bioaerosol Detection," Journal of Quantitative Spectroscopy & Radiative Transfer, Jan. 11, 2022, 25 pages.

Yuxia Hu et al., "Analytic Method on Characteristic Parameters of Bacteria in Water by Multiwavelength Transmission Spectroscopy," Journal of Spectroscopy, Dec. 2017, 8 pages, vol. 2017.

Advisory Action for U.S. Appl. No. 16/921,614, mailing date May 31, 2024, 3 pages, USPTO.

Final Office Action for U.S. Appl. No. 16/921,614, mailing date Mar. 22, 2024, 19 pages, USPTO.

NonFinal Office Action for U.S. Appl. No. 16/921,614, mailing date Jun. 29, 2023, 8 pages, USPTO.

Restriction Requirement for U.S. Appl. No. 16/921,614, mailing date Sep. 27, 2023, 19 pages, USPTO.

Non-Final Office Action for U.S. Appl. No. 16/921,614, mailing date Aug. 6, 2024, 27 pages, USPTO.

Final Office Action for U.S. Appl. No. 16/921,614, mailing date Nov. 27, 2024, 28 pages, USPTO.

* cited by examiner

MINIATURE MULTISPECTRAL DETECTION SYSTEM HAVING MULTIPLE SPECTROMETERS FOR ENHANCED PHOTODETECTION SPECTROSCOPY FOR DETECTION OF PATHOGENS, BIOMARKERS, OR ANY COMPOUND

RELATED APPLICATIONS

This application claims the priority of U.S. Provisional Application No. 63/194,651, filed May 28, 2021, the contents of which are incorporated by reference herein.

FIELD OF THE INVENTION

Embodiments of this invention relate generally to an enhanced photodetection spectroscopy for detection of pathogens, biomarkers, or any compound in stand-alone or mixtures where identification is essential to safety, health, and medical applications.

BACKGROUND

Ultraviolet fluorescence refers to the process where a substance is exposed to sufficient energy at ultraviolet and visible wavelengths between 200 nm and 900 nm and this interaction with the substance results in absorption of that energy and subsequent emission from that substance at a longer wavelength than the applied wavelength. Ultraviolet specular reflection refers to the process wherein certain wavelengths of ultraviolet energy are reflected and others either partially or totally absorbed. Other analytical methods involve absorption of certain wavelengths and not other wavelengths as a substance is illuminated with ultraviolet energy, and this technique is generally employed as an analytical chemistry tool to determine the presence of a particular substance in a sample and, in many cases, to quantify the amount of the substance present. Ultraviolet-visible spectroscopy is particularly common in analytical applications. There are a wide range of experimental approaches for measuring absorption spectra. The most common arrangement is to direct a generated beam of radiation at a sample and detect the intensity of the radiation that passes through it. The transmitted energy can be used to calculate the wavelength-dependent absorption. Raman scattering spectroscopy is also used for substance identification, and excels at identifying individual substances, but significant data processing is required to separate substances in a complex mixture, and the technique is expensive.

Standard spectrometer techniques have difficulty when the target substance is present at a low concentration within a mixture of a large number of distractors, such as a virus in a biological fluid like saliva.

SUMMARY

Embodiments of this invention relate generally to a miniature multi-spectral system to detection pathogen, biomarkers, or any compound from a sample. In one example, a miniature multi-spectral system comprises a first miniature spectrometer to generate a first spectral output based on receiving a first light channel from a sample, a second miniature spectrometer to generate a second spectral output based on receiving a second light channel from the sample, and a processor coupled to the first and the second miniature spectrometers. The processor is configured to execute instructions to perform data fusion of the first and second spectral outputs to generate fused data, and to apply artificial intelligence (AI) of an AI module to the fused data to identify a pathogen, biomarker, or any compound from the sample.

Other features and advantages of embodiments of the present invention will be apparent from the accompanying drawings and from the detailed description that follows below.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION

Testing for viral pathogens (e.g., Coronavirus) is slow and expensive causing costly shutdowns. An absence of rapid testing for bacterial pathogens (e.g., *E. coli, Listeria, Salmonella*) endangers our food supply. Also, the field detection technology for illicit drugs is inadequate, endangering lives.

The present design relates generally to the field of chemical detection, inspection, and classification. The present design provides detection of pathogens (e.g., coronavirus, bacterial pathogens such as *E. coli, salmonella, listeria*, etc.) in a sample (e.g., biological sample, saliva) with high accuracy and sensitivity with an optical instrument. Clinical staff is not needed for operation of this optical instrument. The measurement will take no more than 1-2 minutes from beginning to end and cost very little per measurement. A low cost disposable for a sample is part of the detection system. A radical new spectroscopy architecture integrates 2 or more (miniaturized) spectrometer optical components into one instrument, performs multimodal data fusion on the 2 or more different types of spectra and uses machine learning for pattern recognition and identification.

Figure 1:
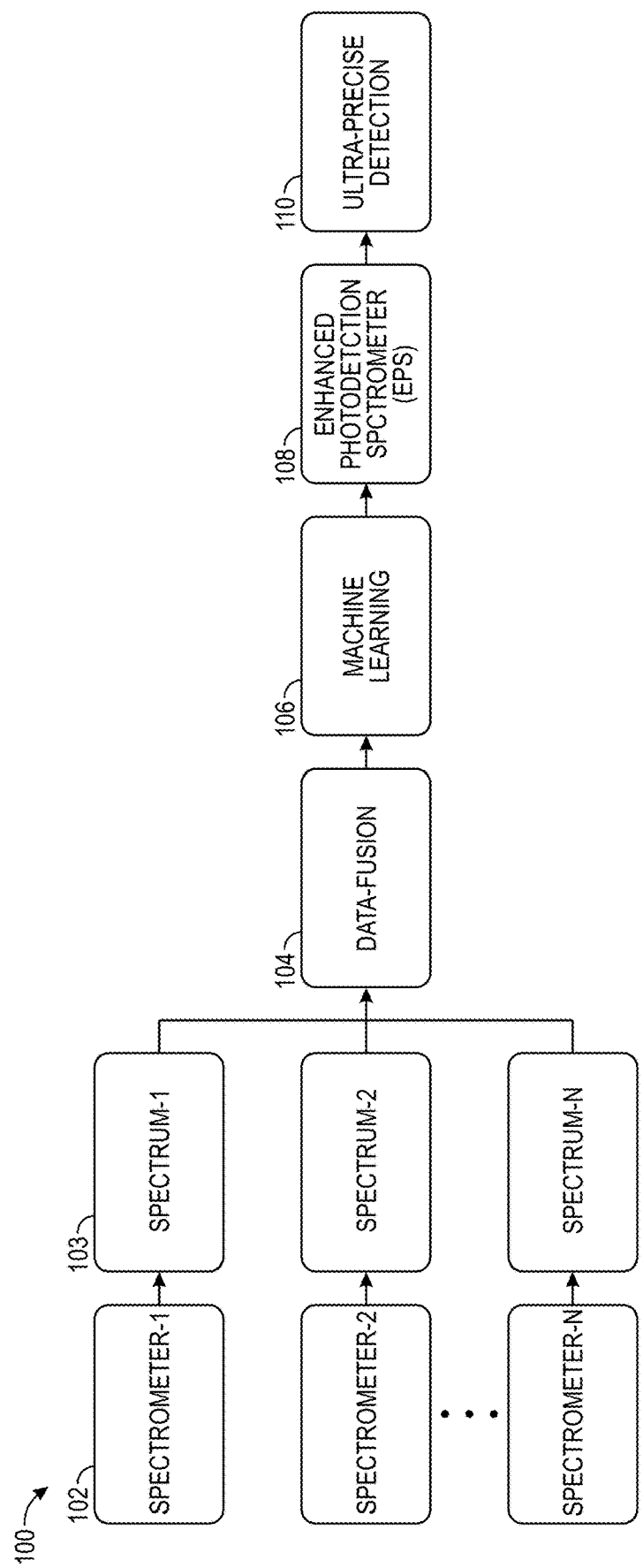
FIG. 1 illustrates a block diagram of an enhanced photodetection spectrometer (EPS) system in accordance with one embodiment.

FIG. 1 illustrates a block diagram of an enhanced photodetection spectrometer (EPS) system in accordance with one embodiment. The enhanced photodetection spectrometer 100 includes multiple spectrometers 102 (e.g., spectrometer-1, spectrometer-2, . . . spectrometer-N) that each generate one of the spectrum output 103 (e.g., spectrum 1, spectrum 2, . . . spectrum N), a data fusion component 104, machine learning 106, enhanced spectrometer 108, and ultra-precise detection 110. A spectrum output from 2 or more of the spectrometers are subjected to data fusion component 104 and AI/machine learning 106 for pattern recognition and data treatment.

The present design demonstrations a radical and path-breaking new spectroscopy architecture that will lead to a point-of-need (PON) handheld instrument for optical detection of pathogens. In one example, this instrument will use saliva samples on a specially designed, low-cost disposable slide for detection of the presence or absence of coronavirus in 2 minutes or less, eliminating the need for device cleaning. Recent research indicates that the concentration of coronavirus in saliva is at least as high as in nasopharyngeal swabs. Measuring on saliva also provides higher safety for personnel, is less invasive, more rapid, and at least as accurate as chemical-based tests.

The new spectrometer architecture includes a combination of at least two spectral processes, fully integrated, with multimodal data fusion and embedded artificial (AI), integrated into one handheld unit. The spectrometer system is able to identify and quantify the measurement of the targeted substance with high sensitivity and accuracy against a complex background. This will result in both determination of the specific target of interest as well as its quantity in the presence of other substances down to very low levels of concentration that would not be possible with a single spectroscopy. This is based on a multispectral architecture, termed Enhanced Photoemission Spectroscopy (EPS) and is illustrated in FIG. 1. The EPS results in sensitivity increase by approximately 100,000 compared to a single spectroscopy.

The key elements of the innovation are:
a radical new multispectral architecture that provides unique capabilities for identifying and quantifying substances, in particular viral pathogens in complex biological fluids;
path-breaking UV photoemission & reflection spectrometer platform;
innovative miniature UV absorption spectrometer system that utilizes a common light source with the UV photoemission spectrometer;
novel AI-based integrated analysis algorithms for multimodal data fusion and rapid analysis of substances, including viruses, down to low concentrations in complex mixtures; and
ability to "learn" the signatures of new viral pathogens not yet in the initial database.

Data fusion is the process of integrating multiple data sources to produce more consistent, accurate, and useful information than that provided by any individual data source. Data fusion processes are often categorized as low, intermediate, or high, depending on the processing stage at which fusion takes place. Data fusion occur when an algorithm uses data from two (or more) different sources, and determines an output based on that data. The most common type of fusion is using information or features from both data sources, and then inputting to the algorithm both features simultaneously at the same time to make a decision. In one exemplary spectral case of data fusion, one spectra has peaks in one region, and another spectra has peaks in a different region, and your decision needs to know not only that there are peaks in these two regions (that's a 1+1=2 case or analyzing the data independent of each other and combining the results), but how these two spectra are jointly correlated with one another. Principal component features from one spectra can be combined with the principal component features of another spectra, and then observe how these features are jointly clustered in feature space (i.e., how the combined features helped improve discriminative clusters for different viruses). A data analysis algorithm can determine which features to extract from each spectra, and these features will be different if you determine these features by analyzing both spectra simultaneously versus analyzing each spectra one at a time.

The present design provides a unique and proprietary advanced micro-electromechanical system (MEMS) technology having the capability to design and produce high performance handheld (pocket-size) UV and Mid-IR spectrometers for a fraction of the cost of equivalent benchtop and handheld standard instruments. A MEMS is a miniature machine that has both mechanical and electronic components. Physical dimensions of a MEMS can range from several millimeters to less than one micrometer.

The miniaturized spectrometer platforms form the key building block modules for design of the radical new integrated multi spectral architecture that is the subject of this patent application. The following provides a brief description of each module.

UV Photoemission-Reflection Spectrometer:

The UV Photoemission-Reflection spectrometer platform incorporates two spectroscopies: narrowband UV fluorescence excitation & detection using custom-made narrowbandpass filters; and UV reflection. This patented design is described further in U.S. application Ser. No. 16/921,614, which is incorporated by reference herein. The UV Photoemission-Reflection spectrometer platform is highly effective in eliminating the background clutter and noise that is typical for standard broadband UV fluorescence. This platform forms the basis for a recently launched handheld, "point-and-shoot" detector of methamphetamine designed for Law Enforcement. The UV Photoemission-Reflection spectrometer platform is the size of a smartphone and is ruggedized for field use. The integration of two spectroscopies, UV photoemission and reflection, results in performance far beyond that of competing handheld Raman spectrometers such as TruNarc from Thermo Fisher, at a significantly lower price. The optical instrument of the present design can include UV Absorption Spectrometer and UV absorption will add a significant data stream to the multimodal spectral integration.

Figure 2:
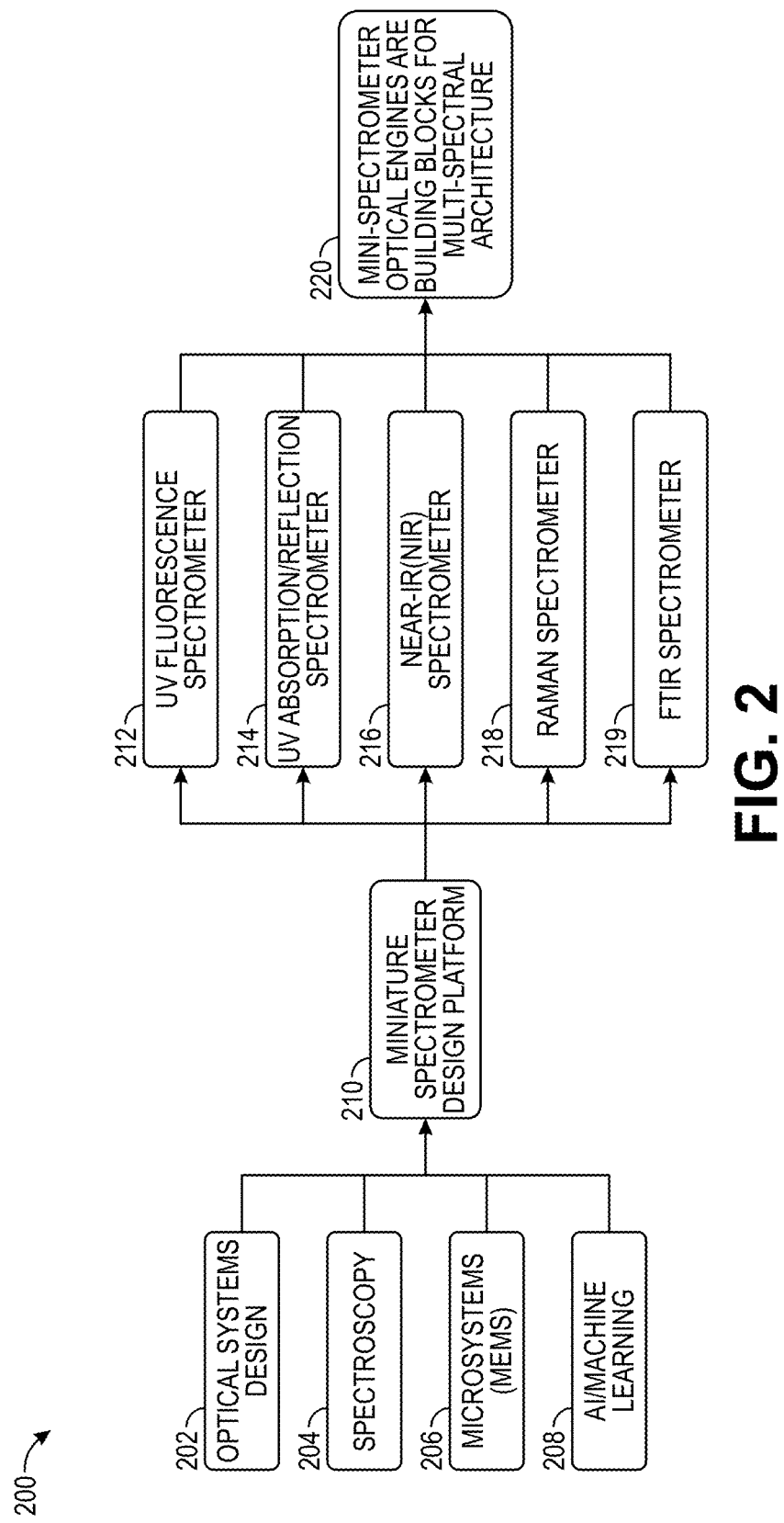
FIG. 2 illustrates Spectrometer building blocks for multi-spectral architecture (EPS) in accordance with one embodiment.

FIG. 2 illustrates Spectrometer building blocks for multi-spectral architecture (EPS) 200 in accordance with one embodiment. The spectrometer building blocks include optical systems design 202, spectroscopy 204, microsystems (MES) 206, and AI/machine learning 208. A miniature spectrometer design platform 210 utilizes multiple spectrometers including UV Fluorescence spectrometer 212, UV absorption/reflection spectrometer 214, a near-IR (NIR) spectrometer 216, a Raman spectrometer 218, or Fourier transform infrared (FTIR) spectrometer 219.

Figure 3:
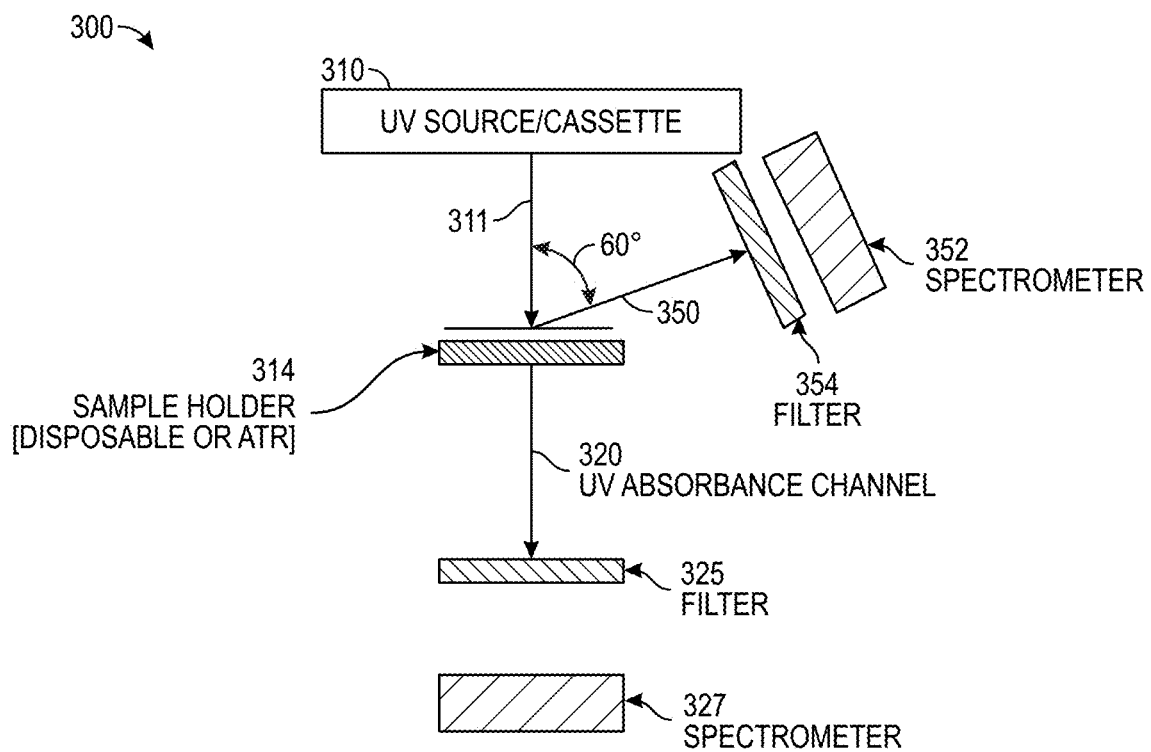
FIG. 3 illustrates components of UVF/UVA EPS system 300 for viral detection that can be used to detect SARS-CoCV-2 coronavirus in saliva in accordance with one embodiment.

FIG. 3 illustrates components of UVF/UVA EPS system 300 for viral detection that can be used to detect SARS-CoCV-2 coronavirus in saliva in accordance with one embodiment. The system 300 includes a UV source/cassette 310, a sample holder 314 (e.g., disposable holder, Si ATR plate) to support or hold a sample, a UV absorbance channel 320, and a UV fluorescent emission channel 350. The channel 320 passes through a linear UV filter 325 to spectrometer 327 having a linear UV detector. The channel 350 passes through a linear variable UV filter 354 to a spectrometer 352 having linear UV detector. In one example, two fluorescence channels were used with two independent excitation wavelengths.

The UV source 310 generates UV light 311 that is directed on the sample of the sample holder 314 and then the light is reflected as the UV fluorescent emission channel 350 or transmitted as the UV absorbance channel 320. The UV detector of the spectrometer 352 receives the fluorescent emission channel 350 and the UV detector of the spectrometer 327 receives the UV absorbance channel 320 in order to identify and characterize pathogens, biomarkers, or any compound.

The sample holder can be a silicon (Si) attenuated total reflection plate (ATR). This plate can be an inexpensive disposable onto which the sample material is applied. In one embodiment, a thin ruggedly antireflection coated Si window is installed in the spectrometer, possibly at an angle to mitigate residual reflections, so that the Si ATR plate can be inserted into the spectrometer and spring-loaded onto this window or another fixed surface for consistent measurements. This embodiment allows for sealing the spectrometer optical train and filling with inert gas to reduce water vapor and $CO_2$ absorption lines in the spectrum.

Micro-machined Si ATR methods have been shown to provide enhancements in sample absorption of a factor of 2 to 4 compared to typical sample absorption schemes. This present design can also utilize a signal-enhanced Si ATR plate that has been shown to provide a signal/noise enhancement of a factor of 10 to 18 compared to a standard diamond ATR that is used commercially in FT-IR bench instruments.

Etched structures with dimensions smaller than the mid-IR wavelengths are required on the sample side of the plate to achieve this enhancement. The enhanced ATR plate can achieve much higher performance than a standard grating instrument in the MIR.

The structure on the sample side of the enhanced Si ATR plates has been shown to be able to separate plasma/serum from whole blood as effective as centrifuging, opening entirely new avenues for quick and low-cost whole blood analysis.

In one example, the Si ATR plate is based on a double-side-polished (100) silicon wafer with v-shaped grooves of f111 g facets on their backside. These facets are formed by crystal-oriented anisotropic wet etching within a conventional wafer structuring process (e.g., typical wafer thickness of 500 µm). These facets are used to couple infrared radiation into and out of the plate. In contrast to the application of the commonly used multiple-internal reflection ATR elements, these elements provide single-reflection measurement at the sample side in the collimated beam. Due to the short light path within the ATR, absorption in the silicon is minimized and allows coverage of the entire mid-infrared region with a high optical throughput, including the range of silicon lattice vibrations from 300 to 1500 $cm^{-1}$.

In addition to typical ATR applications, i.e., the measurement of bulk liquids and soft materials, the application of this ATR plate serves three purposes: 1) enhance the sample spectral absorption, 2) provide an inexpensive disposable that is convenient for sample application, and 3) present a sufficiently rugged surface that will withstand physician handling.

Thus, the present design relates to a system, process, and method for pathogen and biomarker detection, inspection, and classification. In particular, the present design includes a combination of two or more spectral processes, fully integrated, with multimodal data fusion and embedded artificial intelligence (AI), or machine learning, integrated into one miniature or handheld unit. The miniature EPS system or optical device is much smaller than normal and has millimeter dimensions (e.g., all dimensions of 100 mm or less; 100 mm×100 mm×40 mm).

Figure 4:
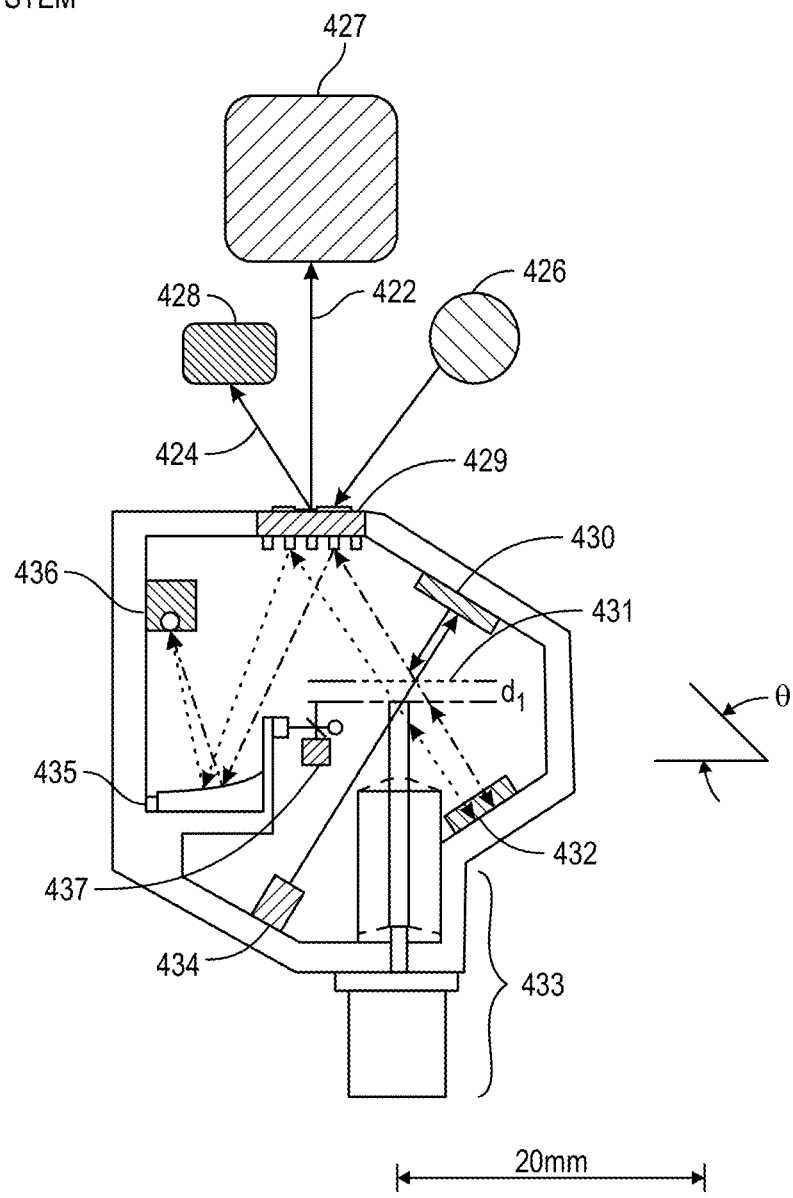
FIG. 4 illustrates components of a compact EPS detector system 400 in accordance with one embodiment.

FIG. 4 illustrates components of a compact EPS detector system 400 in accordance with one embodiment. The system 400 includes a UV source 426 (e.g., Xenon UV light source for fluorescence detection system with collimator), a sample holder 429 (e.g., disposable holder, plate, Si ATR plate) having a sample, a UV absorbance channel 422 that is received by an absorbance spectrometer 427 (e.g., UV-Visible Spectrometer) having a detector (or array of detectors), and a UV fluorescent emission channel 424 that is received by a fluorescence spectrometer 428 (e.g., UV Fluorescence spectrometer) having a detector (or array of detectors).

In one example, a disposable sample is positioned on an inexpensive ATR crystal slide. The sample slide potentially contains the pathogen that is inserted into a disposable surround so that the EPS System is contamination-free throughout the measurement process. No sample preparation is required other than applying the patient's fluid onto the disposable inner ATR slide.

In one example, the system 400 includes a MEMS IR light source 434 for a FT-IR system, FT-IR fixed mirrors 430 and 432, a movable FT-IR beamsplitter 431 for sample Fourier scan, a beamsplitter Actuator 433 to move the beamsplitter by a distance d1, an Off-Axis Mirror 435 to focus output beam of FT-IR onto spectrometer 436 having an ambient-temperature IR detector, and a Laser Diode alignment Sensor System 437 to provide Laser diode-based alignment for internal interferometer stabilization. The IR light is directed to the beamsplitter 431 and then partially directed back to mirror 432 or partially transmitted through the beamsplitter 431 to the mirror 430. The IR light is then directed from the mirrors 430 and 432, to the beamsplitter at an angle theta to the sample of the sample holder 429.

In this example, three spectrometers each generate spectrum output for 3 spectroscopic processes including FT-IR, UV Fluorescence, and Specular reflection. The miniature spectrometers are coupled to an advanced artificial intelligence data system to reduce false positives and false negatives to a fraction of conventional single-detection process pathogen analysis systems.

In another example, the EPS system could be configured to use only one UV spectrometer in conjunction with the FTIR, either the fluorescence spectrometer or the UV absorption spectrometer.

Figure 5:
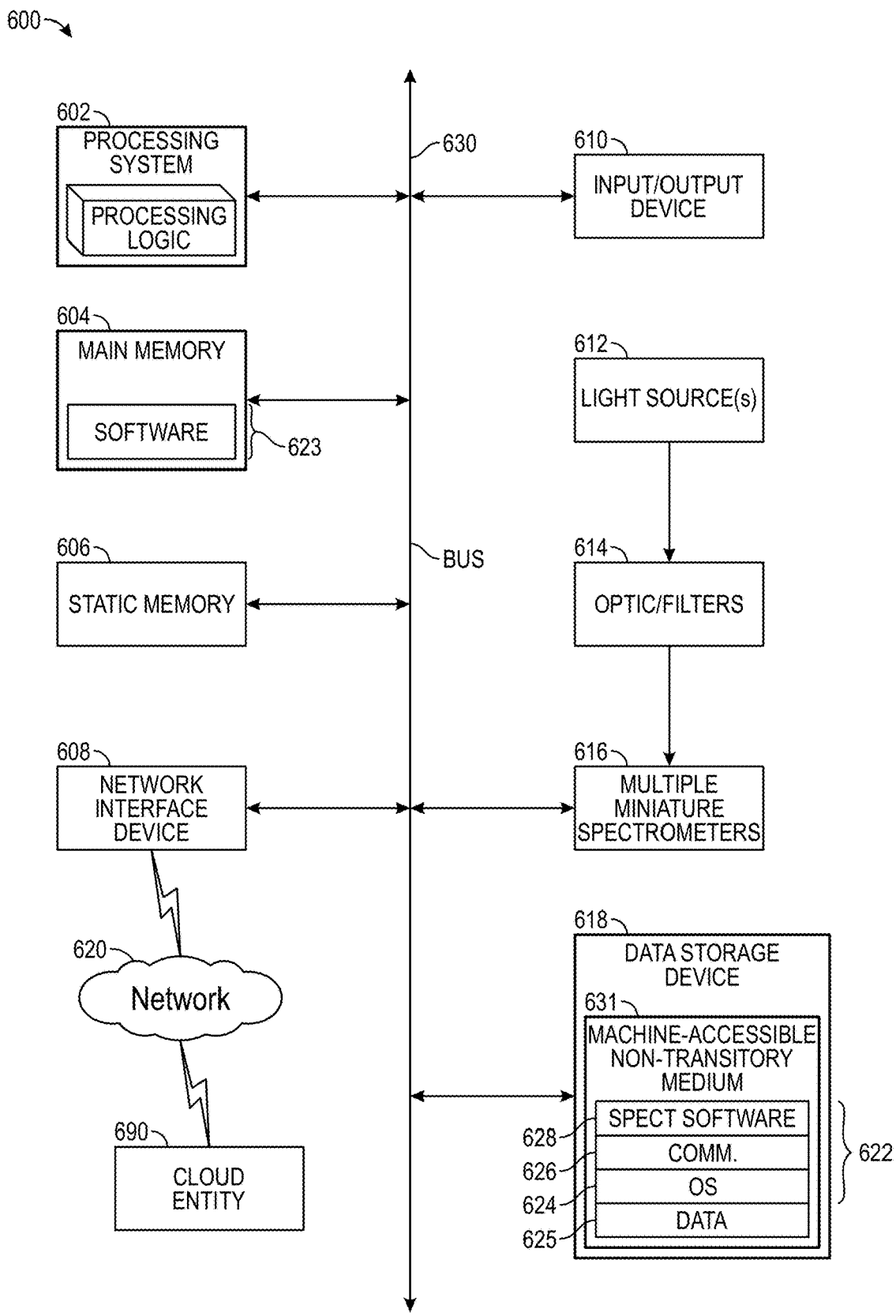
FIG. 5 illustrates a diagrammatic representation of a machine in the exemplary form of a computer system or device 600 within which a set of instructions, for causing the machine to perform any one or more of the methodologies discussed herein, may be executed, in accordance with one embodiment.

FIG. 5 illustrates a diagrammatic representation of a machine in the exemplary form of a computer system or device 600 within which a set of instructions, for causing the machine to perform any one or more of the methodologies discussed herein, may be executed, in accordance with one embodiment. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 600 (e.g., multi-spectral detection device or system 600 that integrates optical components of two or more mini-spectrometers) includes a processing system 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The multi-spectral detection system 600 is configured to execute instructions to perform algorithms and analysis to determine at least one of specific substances detected.

The multi-spectral detection system 600 is configured to collect data and to transmit the data directly to a remote location such as cloud entity 690 that is connected to network 620. A network interface device 608 transmits the data to the network 620. The data collected by the system 600 can be stored in data storage device 618 and also in a remote location such as cloud entity 690 for retrieval or further processing.

Processing system 602 represents one or more general-purpose processing devices such as a microprocessor, central processing unit, or the like. More particularly, the processing system 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 602 may also be one or more special-purpose processing devices such as an application specific integrated circuit (ASIC), a field programmable gate array (FPGA), a digital signal processor (DSP), network processor, or the like. The processing system 602 is configured to execute the processing logic 640 for performing the operations and steps discussed herein. The processing system 602 may include a signal processor, AI module, digitizer, int., and synch detector.

Excitation energy from one or more excitation (i.e., light) source(s) 612 is directed through a spectral filter at target material(s) in order to generate an emission. Although light source(s) 612 are shown, the disclosed embodiments may include any number of excitation sources, including using only a single light source. Preferably, light source or sources may produce narrow-band energy of about 10 nanometers or less. More preferably, the narrow-band energy is about 3 nanometers or less. Light sources may be turned on and off quickly, such as in a range of about or less than 0.01 of a second. Preferably, light sources may be turned on and off within a time period of about 0.001 second.

Emission energy from the targeted material is detected through an optic/low-pass spectral filter 614 prior to being analyzed by a spectrometer of multiple miniature spectrometers 616. Visible light filter may be located in front of optic/low-pass spectral filter 614. Visible light filter helps prevent a large spectrum of light from entering the system so that the large spectrum does not overload the subsequent components with information.

Spectrometers 616 [or array of detectors] are coupled to a synchronous detector of the processing system 602. A miniature spectrometer design platform utilizes multiple miniature spectrometers 616 including UV Fluorescence spectrometer, UV absorption/reflection spectrometer, a near-IR (NIR) spectrometer, a Raman spectrometer, or FTIR spectrometer.

The device 600 may further include a network interface device 608. The device 600 also may include an input/output device 610 or display (e.g., a liquid crystal display (LCD), a plasma display, a cathode ray tube (CRT), or touch screen for receiving user input and displaying output.

The data storage device 618 may include a machine-accessible non-transitory medium 631 on which is stored one or more sets of instructions (e.g., software 622) embodying any one or more of the methodologies or functions described herein. The software 622 may include an operating system 624, spectrometer software 628 (e.g., multispectral detection software), and communications module 626. The software 622 may also reside, completely or at least partially, within the main memory 604 (e.g., software 623) and/or within the processing system 602 during execution thereof by the device 600, the main memory 604 and the processing system 602 also constituting machine-accessible storage media. The software 622 or 623 may further be transmitted or received over a network 620 via the network interface device 608.

The machine-accessible non-transitory medium 631 may also be used to store data 625 for measurements and analysis of the data for the detection system. Data may also be stored in other sections of device 600, such as static memory 606, or in cloud entity 690.

In one embodiment, a machine-accessible non-transitory medium contains executable computer program instructions which when executed by a handheld optical device (e.g., system 100, EPS system 300, EPS system 400) cause the system to perform any of the methods discussed herein.

The disclosed embodiments allow for an extensive number of applications including detecting and characterizing pathogens, biomarkers, or any compound. A non-exclusive list of medical applications includes, but is not limited to:
  measuring pathogenic viruses in bodily fluids, in particular SARS-COV-2, which can be measured in mass facilities, such as stadiums and concert halls;
  rapid determination of infection;
  medical diagnostic testing by detection of validating clinical recommendations for treatment, especially for diseases where onset of critical patient conditions is likely to result in rapidly declining health; and
  rapid determination in a physician's office or elsewhere of the presence or absence of viral or bacterial pathogens in a patient in order to direct proper treatment).

Applications of biomarkers include measurement of biomarkers in diseases include, but not limited to:
  Acute Bronchitis, Acute Respiratory Distress Syndrome (ARDS), Alpha-1 Antitrypsin Deficiency, Asbestosis, Asthma, Blood Culture, Bone Disease, Bronchiectasis, Bronchiolitis. Bronchiolitis Obliterans with Organizing Pneumonia (BOOP), Bronchopulmonary Dysplasia, Byssinosis, Cancers, Chronic Obstructive Pulmonary Disease (COPD), Chronic Thromboembolic Pulmonary Hypertension (CTEPH), Coccidioidomycosis, Cough, Cryptogenic Organizing Pneumonia (COP), Cystic Fibrosis (CF), Deep Vein Thrombosis (DVT)/Blood Clots, Emphysema, Encephalitis, Enteric pathogens, Exosomal biomarkers for cancer and other diseases, Gastrointestinal Disease, Hantavirus Pulmonary Syndrome (HPS), Histoplasmosis, Human Metapneumovirus (hMPV), Hypersensitivity Pneumonitis, Idiopathic Pulmonary Fibrosis (IPF), Influenza (Flu), Interstitial Lung Disease (ILD), Intubation infections, Kidney Disease, Liver Disease, Lung Cancer, Lymphangioleiomyomatosis (LAM), Lymphoma and Leukemia, Meningitis, Mesothelioma, Middle Eastern Respiratory Syndrome (MERS), Nontuberculosis Mycobacteria (NTM), Nosocomial Infections, Pancreatic Cancer, Pertussis, Pneumoconiosis, Pneumonia, Primary Ciliary Dyskinesia (PCD), Pulmonary Arterial Hypertension (PAH), Pulmonary Fibrosis (PF), Pulmonary Hypertension, Respiratory Infections, Respiratory Syncytial Virus (RSV), Sarcoidosis, Severe Acute Respiratory Syndrome (SARS), Shortness of Breath, Silicosis, Sleep Apnea (OSA), Sudden Infant Death Syndrome (SIDS), and Tuberculosis (TB).

Other measurement applications (including, but not limited to):

Kidney diseases, any material with biomarkers whose absorption spectra are in the MIR wavelength range, Cannabis QC/QA measurements, Oil and gas processing and contaminants, Spirits and counterfeits, Drugs and counterfeits, Illicit drugs, Industrial chemicals and constituents, Explosives, Indoor/outdoor air quality, Water quality, Effluent/sewage analysis, Agricultural and forestry, Breath analysis, Hospital air monitoring, Anesthetic Gases, In vivo imaging, and Food safety/quality/adulteration.

Figure 6:
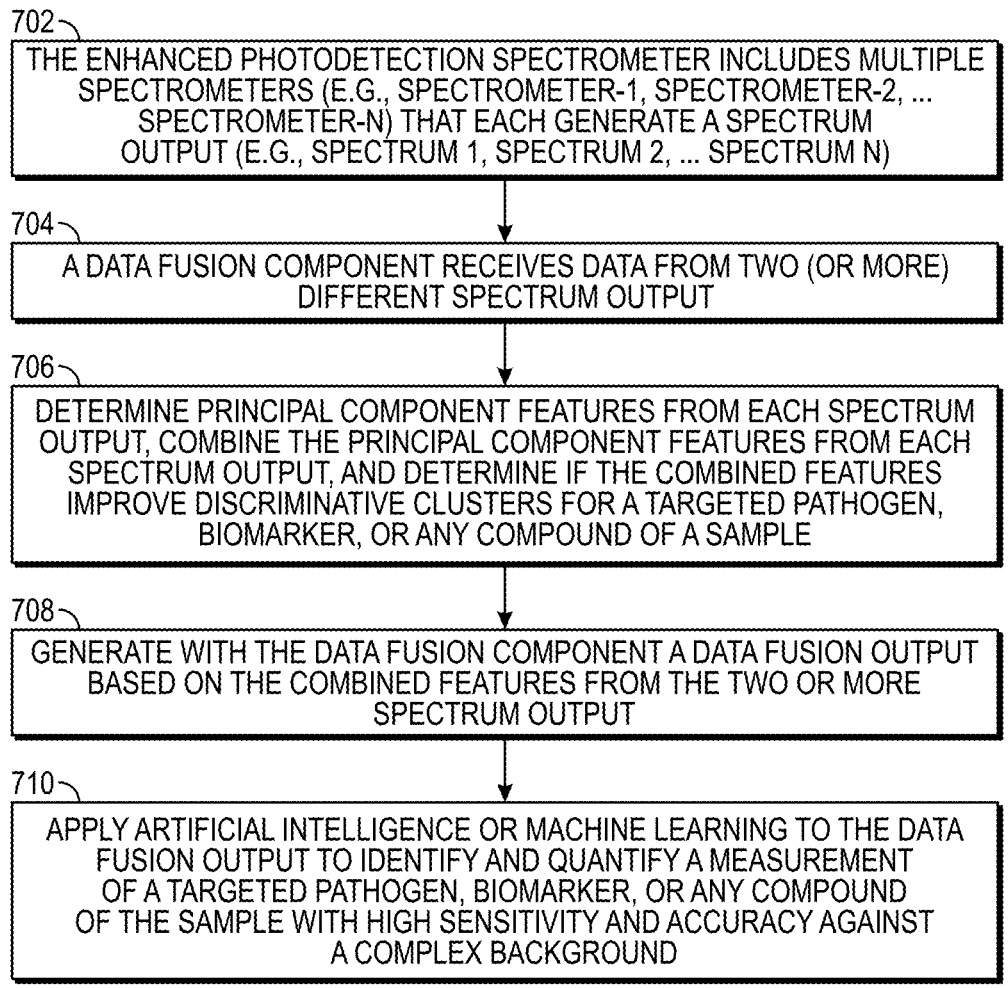
FIG. 6 illustrates a method for operations of an enhanced photodetection spectrometer (EPS) system in accordance with one embodiment.

FIG. 6 illustrates a method for operations of an enhanced photodetection spectrometer (EPS) system (e.g., optical handheld device) in accordance with one embodiment. At operation 702, the enhanced photodetection spectrometer includes multiple spectrometers (e.g., spectrometer-1, spectrometer-2, . . . spectrometer-N) that each generate a spectrum output (e.g., spectrum 1, spectrum 2, . . . spectrum N). At operation 704, a data fusion component receives data from two (or more) different spectrum output.

At operation 706, the method determines principal component features from each spectrum output, combines the principal component features from each spectrum output, and determines if the combined features improve discriminative clusters for a targeted pathogen, biomarker, or any compound of a sample.

At operation 708, the data fusion component generates a data fusion output based on the combined features.

At operation 710, the method includes applying artificial intelligence or machine learning to the data fusion output to identify and quantify a measurement of a targeted pathogen, biomarker, or any compound of the sample with high sensitivity and accuracy against a complex background. This will result in both determination of the specific target of interest as well as its quantity in the presence of other substances down to very low levels of concentration that would not be possible with a single spectroscopy. The AI may include novel AI-based integrated analysis algorithms for multimodal data fusion and rapid analysis of substances, including viruses, down to low concentrations in complex mixtures and have an ability to "learn" the signatures of new viral pathogens not yet in the initial database.

It will be apparent to those skilled in the art that various modifications and variations can be made in the disclosed embodiments of the privacy card cover without departing from the spirit or scope of the invention. Thus, it is intended that the present invention covers the modifications and variations of the embodiments disclosed above provided that the modifications and variations come within the scope of any claims and their equivalents.

What is claimed is:

1. A miniature multi-spectral system comprising:
   a first Fourier transform infrared (FTIR) miniature spectrometer to generate a first spectral output based on receiving a first light channel from a sample;
   a second miniature spectrometer to generate a second spectral output based on receiving a second light channel from the sample;
   a micro-electromechanical system (MEMS) infrared (IR) light source for the first FTIR miniature spectrometer;
   a movable FTIR beamsplitter for a sample Fourier scan;
   a beamsplitter actuator to move the movable FTIR beamsplitter by a distance d1; and
   one or more processors coupled to the first and the second miniature spectrometers, wherein the one or more processors is configured to execute instructions to perform data fusion of the first and second spectral outputs, to generate fused data and to apply artificial intelligence (AI) of an AI module to the fused data to identify a pathogen, biomarker, or any compound from the sample.

2. The miniature multi-spectral system of claim 1, wherein the second miniature spectrometer comprises a fluorescence spectrometer to receive the second light channel that comprises a UV fluorescent emission channel.

3. The miniature multi-spectral system of claim 1, wherein the second miniature spectrometer comprises a UV fluorescence spectrometer.

4. The miniature multi-spectral system of claim 1, wherein the second miniature spectrometer comprises an absorbance or fluorescence spectrometer and the first miniature spectrometer comprises a Fourier Transform Infrared (FTIR) spectrometer.

5. The miniature multi-spectral system of claim 1, wherein the first miniature spectrometer and the second miniature spectrometer comprise two of a UV Fluorescence spectrometer, a UV absorption/reflection spectrometer, a near-IR (NIR) spectrometer, a Raman spectrometer, or Fourier transform infrared (FTIR) spectrometer.

6. The miniature multi-spectral system of claim 1, further comprising:
   a third miniature spectrometer to generate a third spectral output based on the sample.

7. The miniature multi-spectral system of claim 6, wherein the third miniature spectrometer comprises a Raman spectrometer or a Fourier Transform Infrared (FTIR) spectrometer.

8. The miniature multi-spectral system of claim 1, further comprising:
   a variable database that includes known substances and subsequently learned substance signatures resulting from applying the AI.

9. The miniature multi-spectral system of claim 8, wherein the AI module to generate the variable database.

10. The miniature multi-spectral system of claim 1, wherein the miniature multi-spectral system is a handheld optical instrument for optical detection.

11. The miniature multi-spectral system of claim 1, further comprising:
    FTIR fixed mirrors;
    and
    an Off-Axis Mirror to focus an output beam onto the FTIR spectrometer having an ambient-temperature IR detector.

12. A miniature handheld multi-spectral system comprising:
    a first miniature spectrometer to generate a first spectral output based on receiving a first light channel from a sample;

a second miniature spectrometer to generate a second spectral output based on receiving a second light channel from the sample; and one or more processors coupled to the first and the second miniature spectrometers, wherein the one or more processors is configured to execute instructions to perform data fusion of the first and second spectral outputs by determining principal component features from each spectrum output and combining the principal component features from each spectrum output to generate fused data, to determine if combined features improve discriminative clusters for a targeted pathogen, biomarker, or any compound of the sample and to apply artificial intelligence (AI) of an AI module to the fused data to identify and quantify a measurement of the targeted pathogen, biomarker, or any compound from the sample.

13. The miniature handheld multi-spectral system of claim 12 further comprising:
a UV source; and
a sample holder to support or hold the sample.

14. The miniature handheld multi-spectral system of claim 13, wherein the UV source to generate UV light that is directed on the sample of the sample holder.

15. The miniature handheld multi-spectral system of claim 14, wherein the UV light is transmitted through the sample holder to form the first light channel that comprises a UV absorbance channel, wherein the UV light is reflected by the sample holder to form the second light channel that comprises a UV fluorescent emission channel.

16. The miniature handheld multi-spectral system of claim 15, further comprising:
a first UV detector to receive the absorbance channel; and
a second UV detector to receive the fluorescent emission channel in order to identify and characterize pathogens, biomarkers, or any compound.

17. The miniature handheld multi-spectral system of claim 12, wherein the one or more processors is configured to apply artificial intelligence (AI) of an AI module to the fused data to identify a pathogen, biomarker, or any compound from the sample.

* * * * *